May 24, 1932. A. S. BAILEY 1,859,282
CONTINUOUS FILTER APPARATUS
Filed Oct. 4, 1928 5 Sheets-Sheet 1

Fig.1,

May 24, 1932. A. S. BAILEY 1,859,282
CONTINUOUS FILTER APPARATUS
Filed Oct. 4, 1928 5 Sheets-Sheet 4

Inventor
A. S. Bailey
By his Attorney
R. J. Dearborn

May 24, 1932. A. S. BAILEY 1,859,282
CONTINUOUS FILTER APPARATUS
Filed Oct. 4, 1928  5 Sheets-Sheet 5

Patented May 24, 1932

1,859,282

UNITED STATES PATENT OFFICE

ADDISON S. BAILEY, OF HOUSTON, TEXAS, ASSIGNOR TO THE TEXAS COMPANY, OF NEW YORK, N. Y., A CORPORATION OF DELAWARE

CONTINUOUS FILTER APPARATUS

Application filed October 4, 1928. Serial No. 310,264.

The present invention relates to apparatus for cleansing or purifying unclean or impure liquids containing solid particles, and is particularly suited for the filtration of oil containing clay, fuller's earth, or other finely divided materials of a solid nature in suspension in the oil.

The invention is especially adapted for the filtration of mineral lubricating oil that has been treated with finely comminuted adsorbent material in a previous step of the refining operation. For example mineral lubricating oil may be intimately contacted, preferably at elevated temperature, say of the order of 350° F., with fuller's earth or finely divided clay or another adsorbent material which after treatment is retained in the oil usually largely in suspension.

One of the objects of this invention is the removal of the adsorbent material from the oil in a continuous operation, while the oil to be filtered may be regulatably and continuously delivered to the filtering means at said elevated temperature for a definite period or until a definite quantity of oil shall have been treated, without interruption for the renewing of parts or for cleaning out the apparatus or for any other reason.

In another aspect the invention is especially adapted for the filtration of mineral lubricating oil in a dewaxing process where an oil having a wax content has been admixed with a finely comminuted solid such as a filter-aid. For example, mineral oil having a wax content may be thoroughly mixed, preferably at low temperature, say of the order of 15° F., with a comminuted material such as a diatomaceous earth which after mixing may be retained in the oil.

Therefore another object of the invention is the removal of the combined filter-aid and the wax constituent in a continuous operation while the oil thus undergoing treatment may be regulatably and continuously delivered at said reduced temperature.

These with other objects of the invention may be better understood from the following description and the attached drawings which illustrate a preferred embodiment of an improved apparatus adapted to practice continuous filtration processes and in which.

Figure 1:
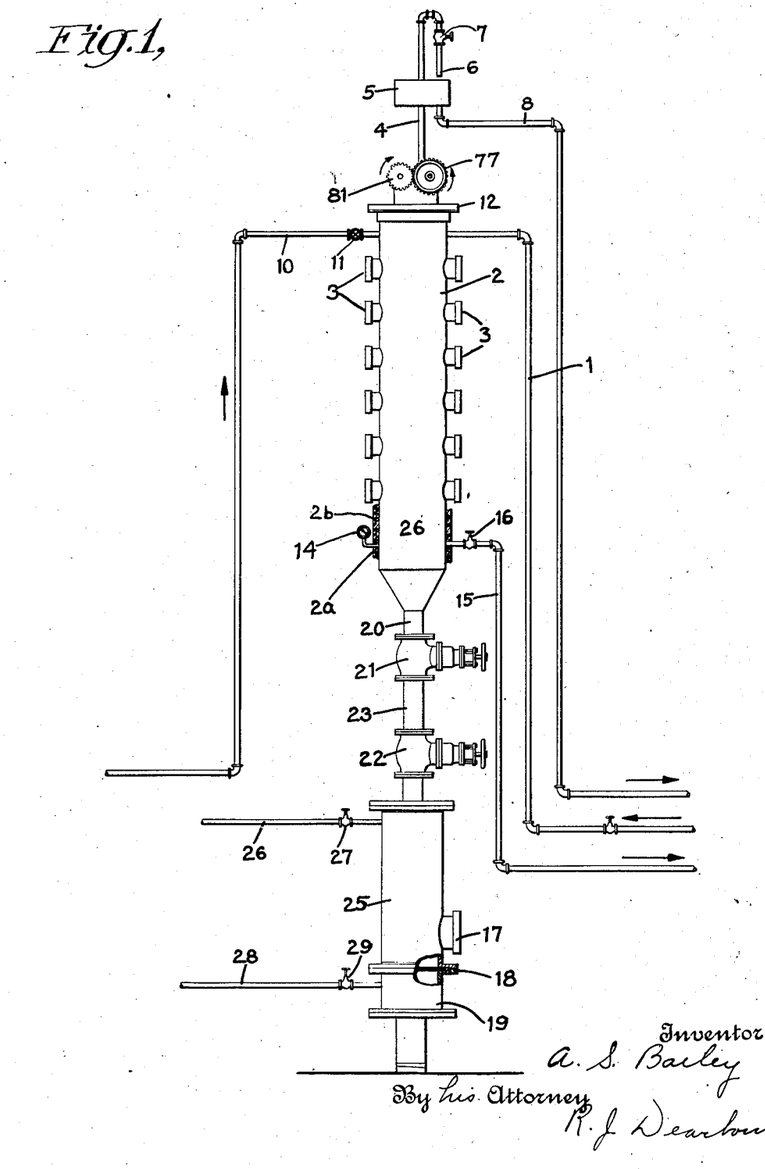
Fig. 1 is a view in elevation of a preferred embodiment of the apparatus.

Referring first to Fig. 1, the oil undergoing treatment is conducted through pipe 1 into a suitably constructed filter chamber 2 having suitable hand hole openings 3 and a pressure indicating gauge 14. The chamber 2 is preferably provided with adequate insulation 2a and a surrounding pipe coil 2b for the purpose of maintaining an elevated temperature or a low temperature. During operation the chamber is maintained substantially full. The oil leaving the filter chamber 2 through a pipe or hollow shaft 4 is delivered into a reservoir 5 through a discharge pipe 6 having a valve 7, and is withdrawn from the reservoir 5 through the pipe 8 for final disposition. A pipe connection 10 is provided for the purpose of admitting a compressed gas such as air into the chamber 2.

When it is desired to discontinue the operation of the filter the oil contained in the chamber 2 is preferably withdrawn through a pipe 15 having a valve 16. In order to facilitate the removal of the liquid, compressed gas may be admitted into the chamber 2 through the pipe 10 and a pressure of several atmospheres may be maintained therein while discharging the oil.

As the adsorbent material is separated from or filtered out of the oil the material may be diverted from the chamber 2 through a bottom outlet pipe 20 having a valve 21 and a column 23 having a valve 22 and be delivered into a chamber 25 having pipe connections 26 and 28, provided with valves 27 and 29. An opening 17 is provided in the chamber 25 just above a screen 18 and a reservoir 19.

Figure 2:
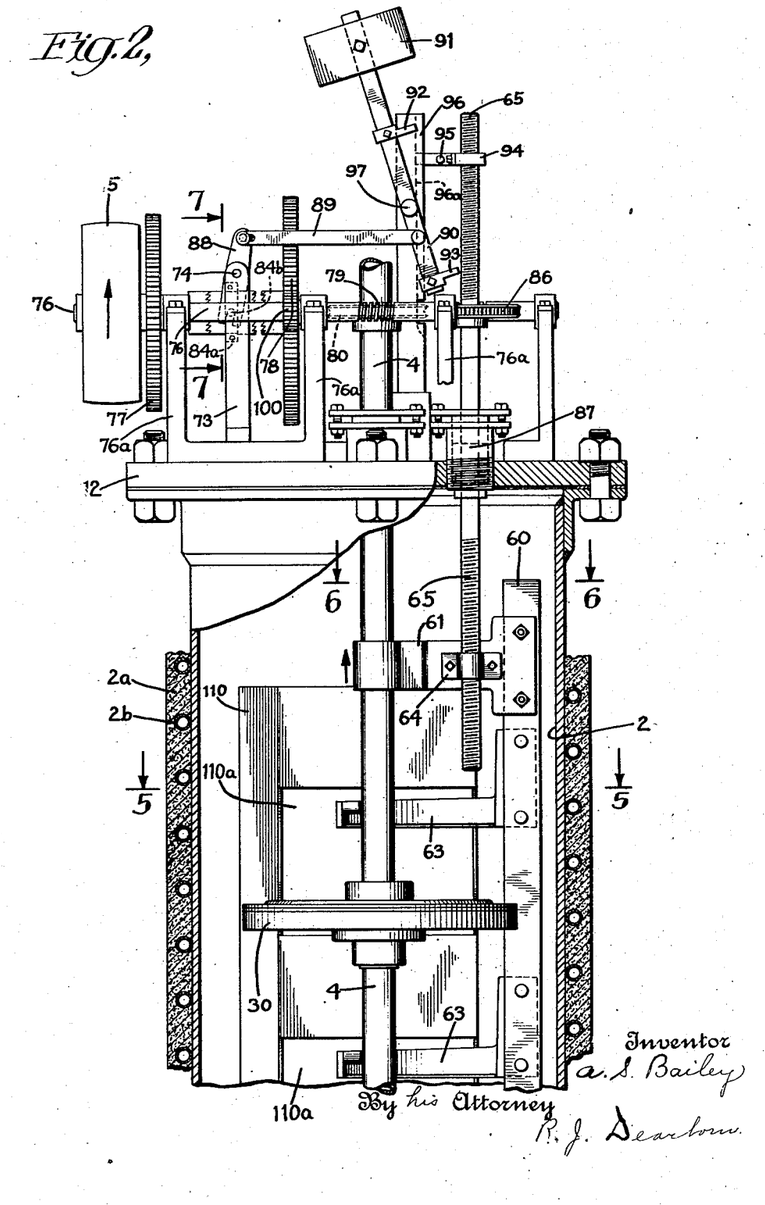
Fig. 2 is an enlarged fragmentary sectional view of the upper portion of the filter chamber showing a portion of the scraper assembly, a portion of the main shaft and appended parts and the operating mechanism for the same in elevation and illustrating the relative elevation of certain openings into said chamber.
Figure 3:
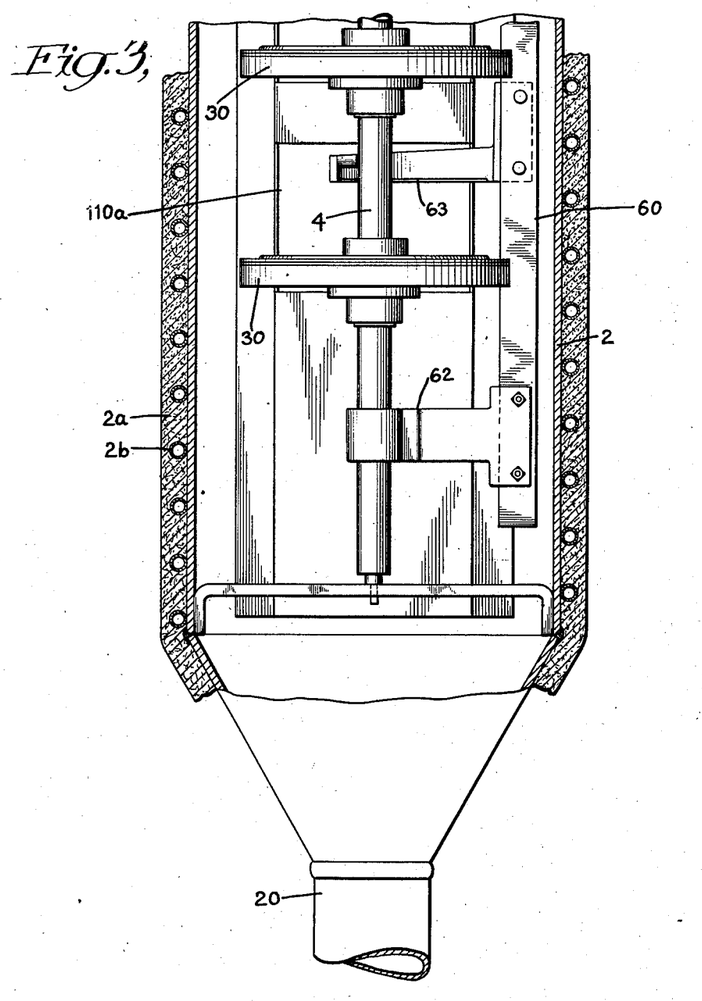
Fig. 3 is an enlarged fragmentary sectional view of the lower portion of the filter chamber illustrating certain parts in elevation.

Referring now to Figures 2 and 3, the chamber 2 contains a plurality of horizontal filter members 30 which are secured in vertical spaced relation upon the hollow shaft 4 which serves to conduct away the oil which is filtered by the filter members. The shaft 4 and filter members 30 mounted thereon are continuously rotated throughout the filtering operation.

The oil upon entering chamber 2 through the pipe 1 may, in the course of operation, entirely or nearly fill said chamber and thus submerge all or part of the multiple filter members 30. Compressed gas may be admitted occasionally, during operation, in order to keep the oil level to a certain maximum which preferably is above the top filter member 30 and yet well below the cover of chamber 2. In other words it is desirable to maintain a suitable gas space or plenum in the chamber 2 while operating. Realizing that a small leakage around stuffing glands is probable in most such equipment I contemplate merely cracking, i. e. barely opening, the valve 11 in line 10 in some instances and thus maintaining a slight gas space above the oil in chamber 2. It will be understood that, depending upon the viscosity of the oil undergoing filtration and conditions of operation, varying pressures may be maintained within the chamber 2.

The mixture of oil and adsorbent material maintained in a body in chamber 2 is continuously augmented by a supply of fresh mixture through pipe 1, while the oil is forcibly percolated through the multiple filter members 30 and is delivered through the hollow shaft 4 to the chamber 5. At intervals, the solid material deposited upon the tops of the filter members 30 is removed by scrapers 63 and discharged into a chute or conduit 110 disposed between the peripheries of the filter members 30 and the inner wall of the chamber 2, and having an open ended bottom. Appropriate space for the chute is provided in the chamber by offsetting the main shaft 4 from the axial center of the chamber 2. This chute 110 is provided with openings 110a opposite the filter members 30 and scrapers 63 to receive the deposits of solid material scraped from the filter members 30, which deposits gravitate through the chute to the funnel-shaped bottom of the chamber 2 and are eventually discharged through the pipe 20.

Figure 8:
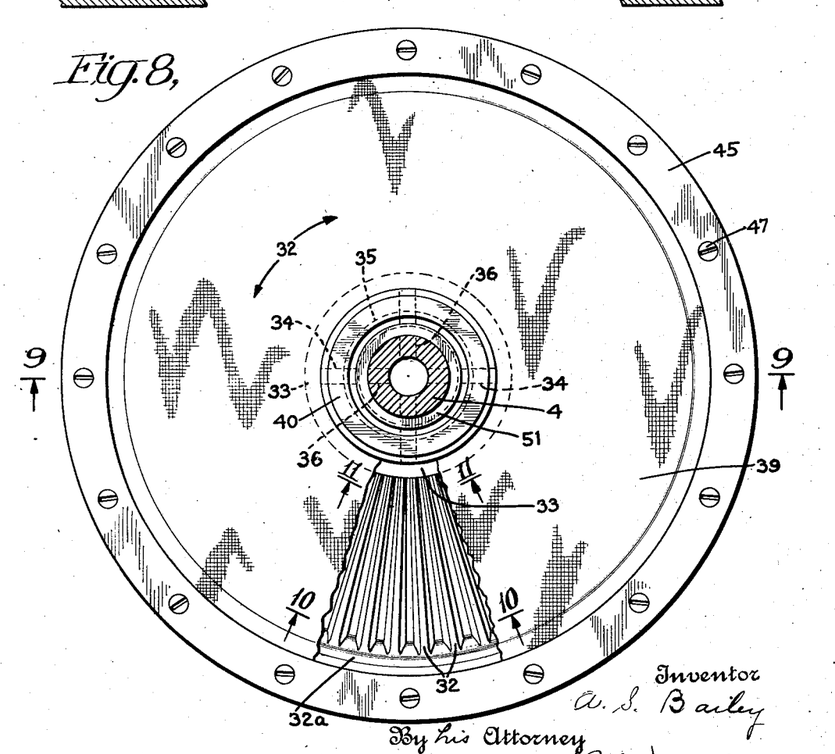
Fig. 8 is an enlarged plan view of a filter member with a portion of the fabric removed.
Figures 9, 10, 11:
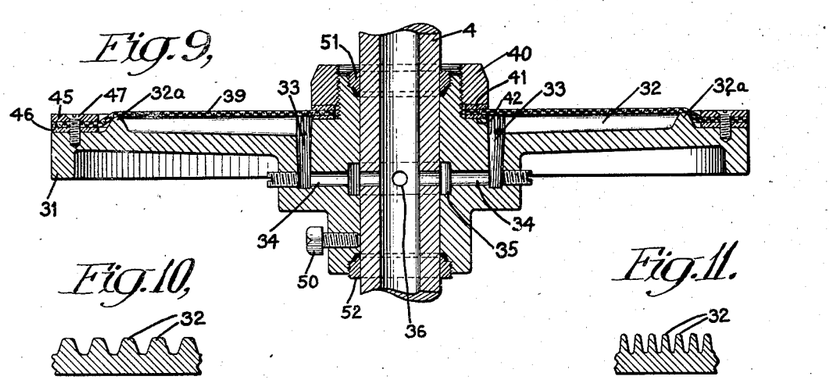
Fig. 9 is cross sectional view of a filter member taken on the line 9—9 of Fig. 8.
Fig. 10 is an enlarged fragmentary sectional view of a filter plate taken on the line 10—10 of Fig. 8.
Fig. 11 is an enlarged fragmentary sectional view of a filter plate taken on the line 11—11 of Fig. 8.

The filtering operation may be better understood by referring to Fig. 8, Fig. 9, Fig. 10, and Fig. 11, particularly to Fig. 9. The main body of each filter member 30 comprises a circular disc-like element 31 having an elongated central hub bored to fit loosely upon the main shaft 4. The upper face of the disc is somewhat dished, and is provided with radial corrugations 32, beginning at the inner hip of a raised peripheral rim or lip 32a and sloping towards its hub and terminating in a circular trough 33 adjacent the base of the hub. The trough 33 is in open communication with a plurality of ducts 34 connecting with an annular groove 35 in the wall of the bore of said hub, and this groove in turn has open communication with the interior of the hollow shaft 4 through a plurality of ports 36.

In assembling the parts of a filter member 30, a circular piece of suitable fabric 39 is placed upon the upper face of the element 31 and clamped to the hub by a threaded ring 40 in conjunction with gaskets 41 and 42. The fabric 39 is extended as desired and made fast to the periphery of the disc-like element 31 by an outer band 45, a gasket 46 and set screws 47. Each filter member 30, comprising an assemblage of parts as heretofore described, is positioned on the shaft 4 and held in place by a set screw 50, with the annular groove 35 in open communicating relation with multiple ports 36 in the main shaft 4, and rigidly held in such position by threaded rings 51 and 52, engaged with companion threads in the ends of the hub portion.

The oil filtering through the fabric 39 moves along the sloping corrugations 32 into the circular trough 33 and, entering the annular groove 35 through the ducts 34, is delivered into the hollow shaft 4 through the ports 36, while the finely divided solid material is restrained by the said fabric 39. Thus, a cake of the comminuted solid material will be built up on each of the filter members 30 as the oil filters through. It is desirable to retain a cake of said material of a certain thickness on the filter member and periodically remove such excess amount therefrom as may collect thereon between periodic removals. This is accomplished by means of a scraping mechanism embodying the scrapers 63 in the following maner.

Referring to Figs. 2, 3, 5, and 6, the shaft 4 and rigidly mounted multiple filter members 30 are situated slightly off of the axial center of the chamber 2 in order to accommodate the discharge chute 110. This shaft and attached filter members 30 are preferably rotated continuously, while the scraping means is lowered periodically to within close proximity of the tops of the filter members 30, thereby scraping off all of the excess portion of the cake of solid material that may have collected on the filter members 30 between scraping periods, and guiding and delivering it through the openings 110a into the discharge chute 110.

The scraping mechanism for removing the cake of solid material collecting upon the top of each of the filter members 30 comprises a vertical supporting bar 60 which is mounted upon suitable bearings or guides 61 and 62, each having an end bored to loosely encircle the main shaft 4. The scraping blades 63 are rigidly mounted upon the bar 60 and the loose end of each blade is fashioned to cooperate with and rest against the shaft 4. The scrapers 63 are curved in form and are so positioned with respect to the discharge chute as to guide the deposits into the chute. The shaft 4 and attached filter members 30 rotate in a clockwise direction, as viewed in plan, and as the filter cake upon filter members 30 is rotated and brought into contact with the scrapers 63, some pressure is thereby brought upon said scrapers. In consequence the loose ends of scrapers 63 are fashioned to cooperate with and rest against the shaft 4 so as to have a firm and rigid support to withstand the pressure imposed upon them during the scraping operation.

The scraping mechanism is supported by the guide 61 which is provided with a laterally projecting threaded lug 64 engaging a vertical threaded shaft 65 which acts in conjunction with suitable automatic operating mechanism to actuate the scraping means through a predetermined cycle.

For this purpose appropriate automatic operating means is provided to periodically lower the scraping mechanism to a predetermined proximity of the filter members 30 and subsequently to raise the scraping mechanism to a predetermined height. This cycle of operation is repeated at intervals throughout the operation.

Referring again to Fig. 2 and Fig. 4, the operating mechanism comprises a pulley 75 driven by suitable means (not shown), which is rigidly mounted upon a shaft 76 upon which gears 77 and 78 are also rigidly mounted. The shaft 76, having suitable bearings 76a supported upon cover plate 12 of the chamber 2, is provided with a worm gear 79, which may be integral with the shaft 76 and which cooperates with a gear 80, attached to the main shaft 4, thereby causing the shaft 4 and the filter members 30 to rotate. The gear 77 cooperates with a gear 81 loosely mounted upon a shaft 82 and provided with a clutch part 83 preferably integral therewith. The clutch part 83 is adapted to be engaged by a movable cooperating clutch part 84 slidably mounted upon shaft 82 and keyed thereto to prevent rotation upon said shaft. Slidable clutch part 84 is provided with a rotatable collar 84a having pins 84b adapted to cooperate with the bifurcated ends of a yoke 88.

Figure 4:
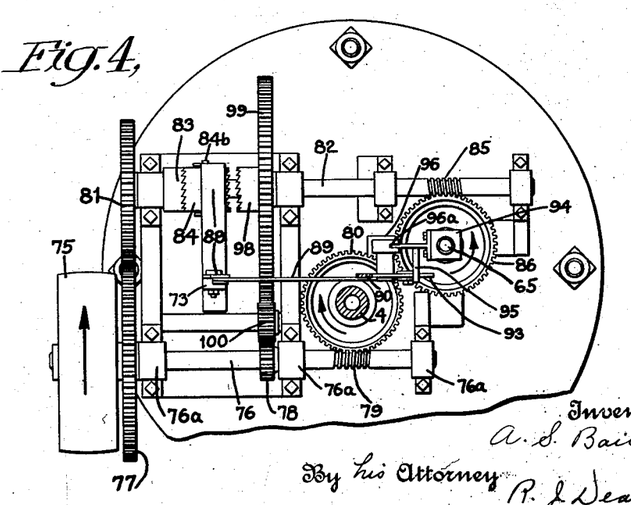
Fig. 4 is a plan view of the operating mechanism.

Thus, with the clutch parts in engagement as illustrated in Figs. 2 and 4, the pulley 75, when driven in the direction indicated by the arrow, acts upon the shaft 76 thereby rotating the gear 77, and the gear 77 cooperating with the gear 81 causes the latter gear to rotate in an opposite direction. As the slidable clutch part 84 is engaged with the clutch part 83, the shaft 82 is thereby caused to rotate. Worm gear 85, which may be integral with shaft 82, cooperates with a gear 86 rigidly mounted on the threaded shaft 65 which is rotatably mounted in a stuffing gland 87. The shaft 65 is thus rotated, and the threaded lug 64 on the supporting guide 61 engaged with the lower threaded portion of shaft 65 is thereby caused to move downwardly on the threads of the shaft 65, thereby lowering the scraping mechanism into cooperative working relation with the filter members 30.

The downward movement of the scraping mechanism continues until the scrapers 63 reach a position a predetermined distance above the filter members 30, at which time the automatic operating mechanism effects a reversal in the direction of rotation of the threaded shaft 65, thereby raising the scraping mechanism away from the filter members a predetermined distance. The automatic operating mechanism then again functions to reverse the operation and cause the scraping mechanism to repeat its cycle of operation.

For accomplishing the results indicated, the slidable clutch part 84 is provided with a rotatable collar 84a having pins 84b which engage the bifurcated ends of a yoke 88 which is pivotally mounted upon a pin 74 at the top of a supporting bracket 73. The upper end of the yoke is connected by a horizontal link 89 to the lower end of an actuating arm 90, which is pivoted upon a pin 97 above the point of connection with the link 89. The pin 97 is carried by a vertical supporting bracket 96 that is fastened to the cover plate 12. The upper end of the actuating arm 90 carries a weight 91 which becomes effective in shifting the slidable clutch part 84 whenever the actuating lever 90 has moved across its dead-center position. In order to move the weighted actuating arm 90 across its dead-center position, it is provided both above and below its pivot pin 97 with adjustable lugs or fingers 92 and 93 which function as limit stops and are adapted to be engaged by a horizontal trip pin 95 projecting outwardly from an interiorly threaded collar 94 which cooperatively engages with the threads of the threaded shaft 65. As this shaft is rotated in one direction or the other, the collar 94 is caused to travel either upwardly or downwardly on the shaft and to bring the trip pin 95 into engagement with the one or the other of the limit stops 92 and 93. To prevent rotation of the collar 94, its outer end is slidably positioned in a groove 96a in the upright bracket 96, which thus serves as a guide to maintain the collar in operative relation with the limit stops 92 and 93.

Whenever the trip pin 95 engages one or the other of the limit stops 92 and 93, its continued movement forcibly rocks or tilts the weighted actuating arm 90 in one direction or the other, to bring it across its dead-center position whereupon the weight 91 acts through gravity and the connecting linkage, already described, to shift the position of the slidable clutch part 84 and to cause it to engage the one or the other of the cooperating clutch parts 83 and 98 to thereby effect a reversal in the direction of rotation of the threaded shaft 65 and thus correspondingly reverse the direction of movement of the scraping mechanism. By suitably adjusting the position of the limit stops 92 and 93 upon the actuating arm 90, the amount of upward and downward travel of the scraping mechanism can be regulated as desired. It is thus possible to adjust the operating mechanism to leave any desired thickness of deposit upon the filter members.

In operation, as the threaded shaft 65 rotates in one direction to lower the scraper mechanism, the end of the arm of the interiorly threaded collar 94, which carries the trip pin 95, travels downwardly in the grooved vertical bracket 96, while the collar moves downwardly on the shaft 65. The trip pin 95 projecting outwardly from the horizontal arm of the collar 94 eventually engages with the limit stop 93 and tilts forward the weight 91 mounted upon the actuating lever 90. By the resultant cooperative movement of link 89 and the pivotally mounted yoke 88, the slidable clutch part 84 is disengaged from the clutch part 83 and immediately engaged with the clutch part 98.

Figures 5, 6, 7:
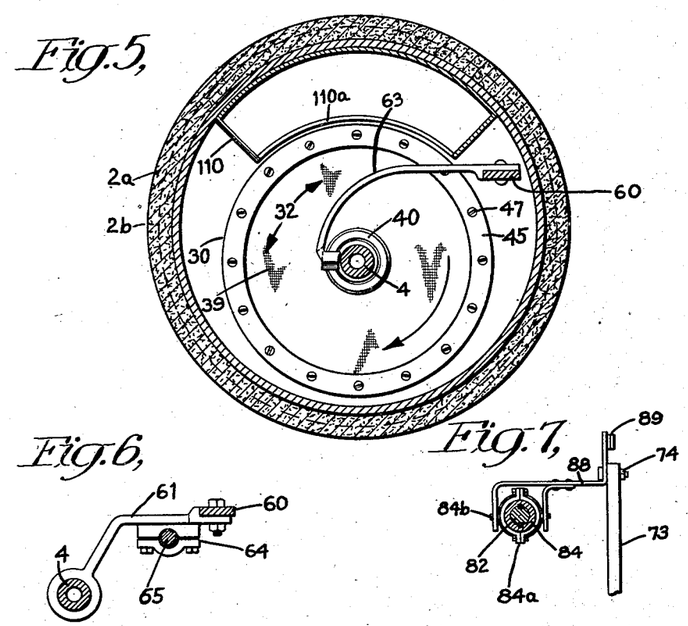
Fig. 5 is a sectional view taken on the line 5—5 of Fig. 2.
Fig. 6 is a cross sectional view through the main shaft, the scraper actuating shaft and the vertical member of the scraper assembly taken on the line 6—6 of Fig. 2.
Fig. 7 is a cross sectional view through one shaft of the operating mechanism illustrating the clutch in end elevation taken on the line 7—7 of Fig. 2.

It will be understood that upon the engagement of the clutch part 84 with the clutch part 98 which is preferably integral with gear 99 loosely mounted on the shaft 82, the gear 99 which cooperates through a gear 100 with a gear 78 on the rotating shaft 76, thereby causes the shaft 82 and attending parts to rotate in a direction opposite that which it rotates when the clutch part 84 is engaged with clutch part 83. Thus, the scraping means is thereby raised as is also the threaded collar 94. The distance of upward travel and the period of time that elapses between scraping actions of the scrapers depends on the predetermined location of the limit stop 92, for when the trip pin 95 moving upwardly engages the limit stop 92, the weighted actuating arm 90 is caused to tilt in a direction opposite that described in connection with the downward movement, and thereby releases the slidable clutch part 84 from the clutch part 98 and reengages it with the clutch part 83, thereby automatically effecting a reversal of the direction of movement of the scraping means.

From the foregoing description it will be understood that the apparatus operates continuously in the filtering operation and receives a regular supply of a mixture of oil and suspended comminuted solid material to be filtered, which is delivered continuously through the pipe 1 into the chamber 2. Any desired pressure may be maintained within the chamber 2 and the filtered oil passing through the filter members is continuously removed from the chamber by means of the hollow shaft 4. Throughout the operation, the solid material in the oil is deposited in cakes upon the filter members 30, and these cakes of deposit are periodically reduced to a predetermined thickness by the action of the scrapers 63. The excess deposit so removed from the filter members is delivered into the discharge chute 110 and eventually discharged from the bottom of the chamber 2 through the pipe 20. In this way, the process is carried on without interruption, the oil and the solid material being continuously separated the one from the other and independently withdrawn.

The solid material collecting in the pipe 20 and conical bottom of the chamber 2 is withdrawn through the valve 21 which may be left open. It then settles in the column 23 which may be of any desired size and length, until said column becomes substantially full of solid material to the substantial exclusion of liquid. The valve 21 is then closed and the valve 22 opened, permitting such material as has collected in the column 23 to be delivered into the chamber 25. After the chamber 25 has filled, the valve 22 is closed and the valve 21 reopened so as to permit chamber 23 to again fill, while the material in chamber 25 is being washed and removed.

The material, retaining a certain amount of oil, collecting in the chamber 25 is preferably washed with an oil solvent, such as a naphtha when treating a mineral oil, which may be delivered to the chamber 25 by means of pipe 26 having a valve 27.

In order to permit ready removal of the material substantially free from oil, there is provided a hand-hole 17 disposed just above a suitable screen 18. The mixed oil and the solvent drops through the screen 18 into a reservoir 19 and is removed by means of pipe 28 having a valve 29. In this order removal of the solid material continues periodically while operating the filter apparatus.

It is evident that many modifications of the apparatus illustrated may be effected without departing from the spirit and scope of the invention and it is desired to be limited in this respect only by the appended claims.

I claim:

1. Filtering apparatus comprising a chamber for liquid to be filtered, a plurality of filter elements contained therein, a vertical shaft upon which the filter members are mounted, movable scraping mechanism for removing deposited material from said filter members including horizontal scraping arms severally having one of their ends adapted to rest against and slide upon said vertical shaft, horizontal guide members severally having one of their ends bored to surround and slide vertically upon said shaft, a vertical bar to which the other ends of said scraping arms and said guide members are attached, and actuating means in cooperative supporting relation to said scraping mechanism for raising and lowering it in position with respect to said filter members.

2. Filtering apparatus comprising a chamber for liquid to be filtered, a plurality of substantially horizontal rotatable filter elements contained therein, vertically movable scraping and guiding means for removing deposits of solid material upon the filter elements, means for receiving the removed deposits from said scraping and guiding means and effecting its discharge and actuating means for advancing the scraping and guiding means into close proximity to the filter elements to remove solid material therefrom and for retreating said scraping and guiding means therefrom after the deposits have been removed.

3. Filtering apparatus comprising a chamber for liquid to be filtered, a plurality of substantially horizontal rotatable filter elements contained therein, vertically movable scraping and guiding means for removing deposits of solid material upon the filter elements, means for receiving the removed deposits from said scraping and guiding means and effecting its discharge and regulatable actuating means for intermittently advancing the scraping and guiding means within predetermined proximity of the filter elements to remove accumulated solid material therefrom and for retreating said scraping and guiding means therefrom after the deposits have been removed and permitting a predetermined period of time to elapse before again advancing said scraping and guiding means into close proximity to the filter elements.

4. Filtering apparatus comprising a chamber for liquid to be filtered, a plurality of filter elements contained therein, a continuously rotatable shaft upon which said filter elements are mounted, means for discharging filtered oil from said filter members and said chamber, movable scraping means positioned within said chamber for cooperation with said filter elements to remove deposits therefrom, means including a rotatable threaded rod for moving said scraping means relative to said filter elements, actuating means for rotating said threaded rod for advancing the scrapers to within close proximity of said filter elements and for retreating the scrapers away from said filter elements, and an adjustable trip element adapted to limit the amount of movement of the scraping means in either direction and to reverse the direction of movement of the scraping means when the limit of movement has been reached.

5. In filtering apparatus comprising a chamber for liquid to be filtered, a rotatable shaft, filter elements mounted thereon, movable scraping means cooperating therewith, regulatable automatic actuating mechanism comprising a continuously driven member, a system of gears cooperating with the driven member for continuously rotating said shaft and the filter elements, another system of gears for actuating the scraping means in one direction to advance said scraping means towards the filter elements, another system of gears for actuating the scraping means in an opposite direction to retreat said scraping means away from the filter elements, and regulatable automatic mechanism comprising a shiftable clutch device for throwing the one or the other of said last systems of gears into operation, weighted actuating means for shifting said clutch device, and means associated with said scraping means and movable therewith for initiating the operation of said weighted actuating means to shift said clutch device at predetermined points in the travel of said scraping means.

6. Filtering apparatus comprising means for continuously delivering a fresh supply of liquid containing foreign matter, a chamber adapted to receive said liquid, a plurality of rotatable filter elements within said chamber adapted to restrain solid material while liquid is being filtered therethrough, means for collecting and conducting filtered liquid from the said chamber, scraping means movable at right angles to the plane of the filter elements for removing restrained deposits of solid material therefrom, means for discharging the solid material from the chamber and actuating means for imparting a reciprocatory movement to said scraping means.

7. Filtering apparatus comprising means for continuously delivering a fresh supply of liquid containing foreign matter, a chamber adapted to receive said liquid, a plurality of rotatable filter elements within said chamber adapted to restrain solid material while liquid is being filtered therethrough, means for collecting and conducting filtered liquid from the said chamber, scraping means movable at right angles to the plane of the filter elements for removing restrained deposits or solid material therefrom, means discharging the solid material from the chamber, and gravity actuating means for periodically advancing and retreating the scraping means within predetermined distances of the filter elements.

In witness whereof I have hereunto set my hand this 22nd day of September, 1928.

ADDISON S. BAILEY.